United States Patent Office 3,509,697
Patented May 5, 1970

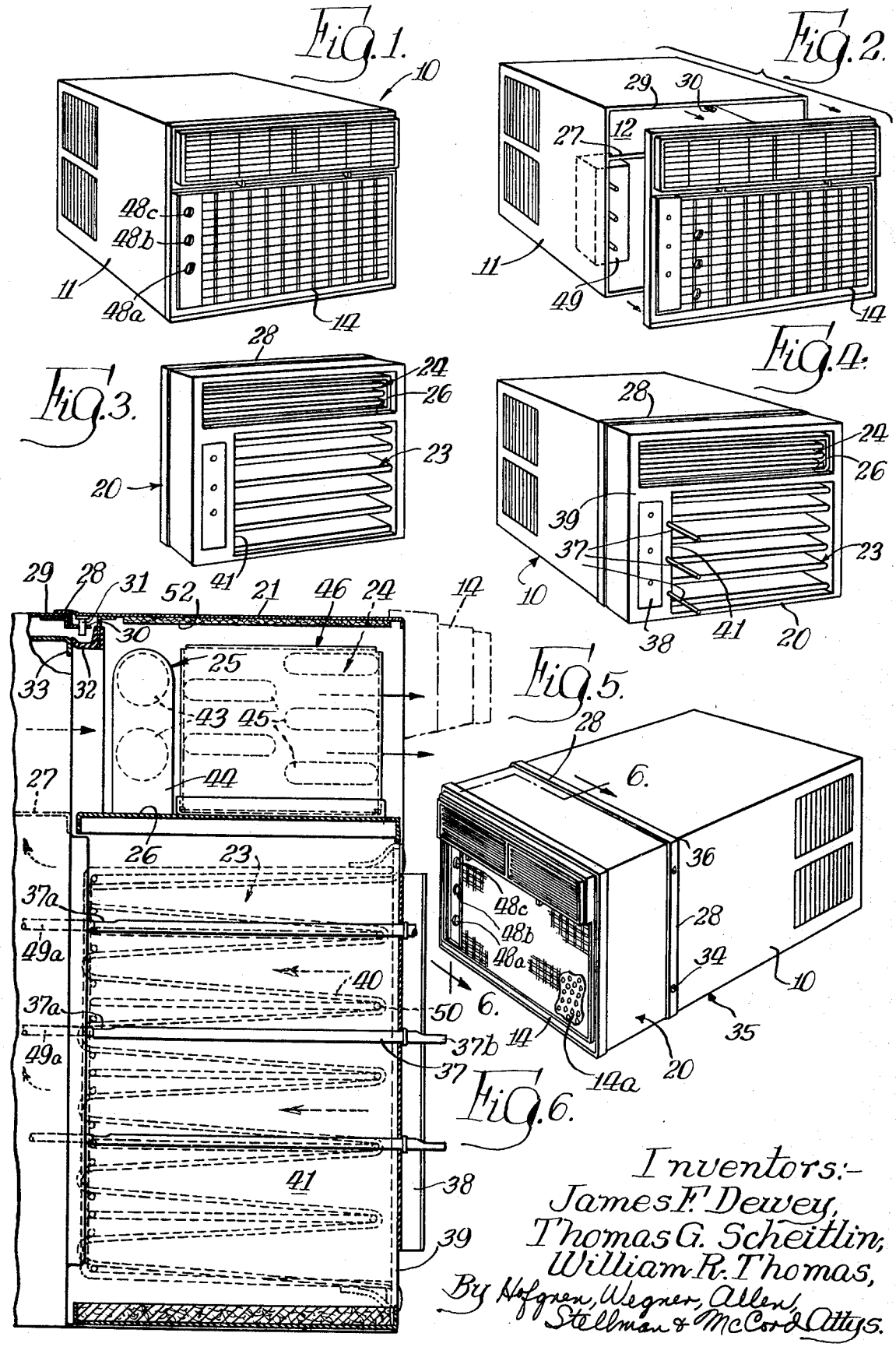

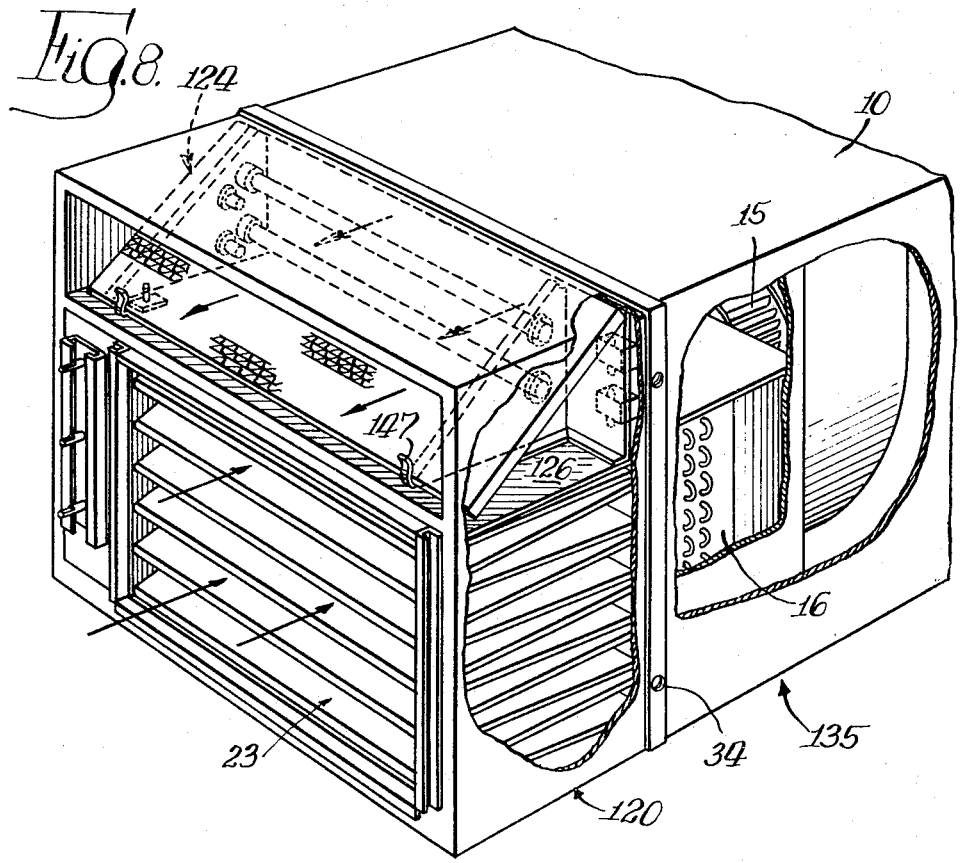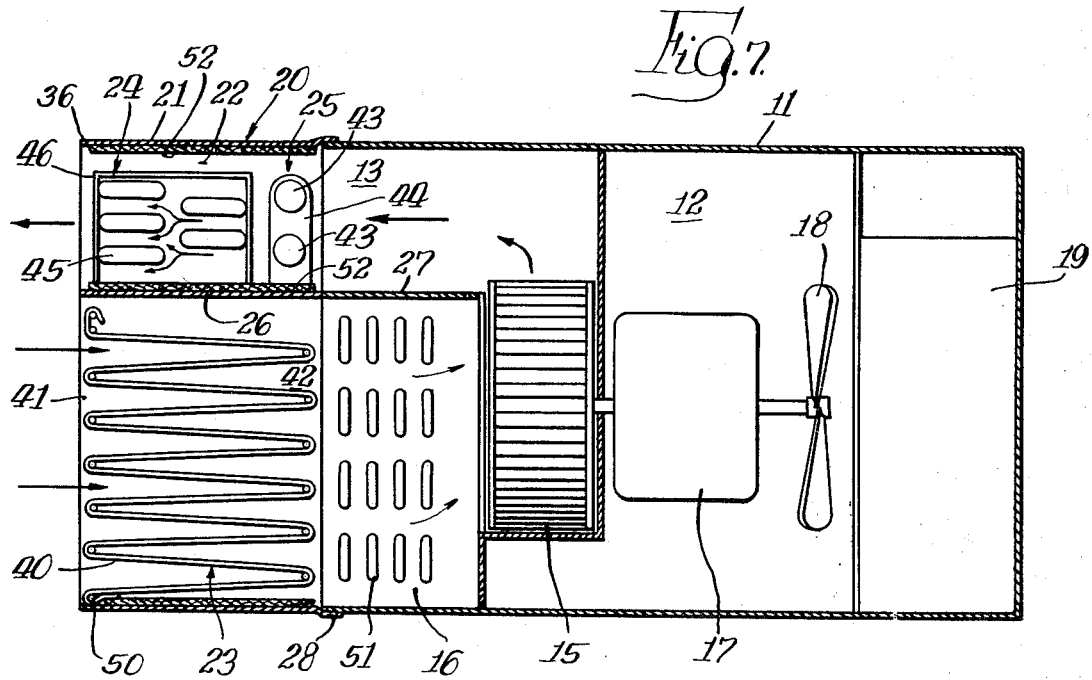

3,509,697
FILTER-SOUND FRONT FOR AIR CONDITIONER
James F. Dewey, Evansville, Ind., Thomas G. Scheitlin, St. Paul, Minn., and William R. Thomas, St. Joseph, Mich., assignors to Whirlpool Corporation, Benton Harbor, Mich., a corporation of Delaware
Filed Apr. 24, 1967, Ser. No. 633,078
Int. Cl. B01d 46/00
U.S. Cl. 55—276                                      16 Claims

ABSTRACT OF THE DISCLOSURE

An air purifier for use with air conditioner apparatus, comprising an auxiliary structure wherein one or more of the following elements, (a) a filter, (b) germicidal radiation means, (c) charcoal absorbent means is provided for treating air moved therethrough by the air moving means of the air conditioner. Means are provided on the enclosure of the auxiliary structure for mounting the grill of an air conditioner thereon after removing the grill from the air conditioner and placing the auxiliary structure in the opening previously occupied by the grill, and means are provided for bringing the controls of an air conditioner through the enclosure for manual control thereof from the front of the grill. The air purifier is lined with sound deadening material for reducing the sound level of air conditioner operating noise.

---

This invention relates to air conditioning apparatus and in particular to air conditioning apparatus having an auxiliary means for purifying the air.

In the known air conditioning apparatuses commercially available, means are provided for drawing in room air, passing the air in heat exchange relationship with a cooling element such as an evaporator coil, and discharging the cooled conditioned air back into the room. Such air conditioners have had the serious disadvantages of producing undesirable noise in the room during operation and in the recirculation to the room of smoke, odors, airborne viruses, etc. which are not removed in the air conditioning operation. The present invention comprehends the provision of an attachment for such air conditioners for absorbing such noise and for purifying the air being so recirculated.

Thus, a principal feature of the present invention is the provision of a new and improved air conditioning apparatus.

Another feature of the invention is the provision of such an air conditioning apparatus comprising means for use with an air conditioner for purifying air conditioned by the air conditioner.

A further feature of the invention is the provision of such an air conditioning apparatus wherein the air purifying means comprises charcoal means for absorbing impurities from the air.

Still another feature of the invention is the provision of such an air conditioning apparatus wherein the air purifying means comprises means for passing germicidal radiation through the air.

A yet further feature of the invention is the provision of such an air conditioning apparatus wherein the attachment is arranged to have the grill normally associated with the air conditioner mountable thereon as the front element thereof.

A further feature of the invention is the provision of such an air conditioning apparatus wherein the attachment provides means for absorbing sound produced by the air conditioner.

Another feature of the invention is the provision of such an air conditioning apparatus including means for permitting ready installation and removal of the air purifying means relative to the air conditioner.

Other features and advantages of the invention will be apparent from the following description taken in connection with the accompanying drawings wherein:

FIG. 1 is a front perspective view of an air conditioner of conventional construction having a front grill;

FIG. 2 is a front perspective of the air conditioner of FIGURE 1, but with the front grill spaced forwardly therefrom for purposes of illustration.

FIGURE 3 is a perspective view of an air purifier attachment apparatus embodying the invention for use with the air conditioner of FIGURE 1;

FIGURE 4 is a perspective view of the air conditioner having the air purifying apparatus installed on the front thereof;

FIGURE 5 is a perspective view of the air conditioner and air purifier assembly with the front grill installed on the front of the air purifier apparatus and with a portion of the front grill broken away to show internal structure;

FIGURE 6 is an enlarged fragmentary vertical section taken substantially along the line 6—6 of FIGURE 5;

FIGURE 7 is a schematic longitudinal vertical section of the assembly of FIGURE 5 with the front grill omitted for clarity; and FIGURE 8 is a fragmentary perspective of an assembly of the air conditioner in a modified form of the attached air purifying apparatus with portions broken away for facilitating illustration of the invention.

In the exemplary embodiment of the invention as disclosed in FIGURES 1 through 7, an air conditioner generally designated 10 illustrated in the form of a room air conditioner of conventional construction is shown to include a cabinet 11 defining an internal space 12 having a front portion 13. The air conditioner 10 normally includes a front grill 14 extending across the front portion 13 of the cabinet space 12 (see FIGS. 1 and 2). Room air is conditioned in the air conditioner 10 by means of a blower 15 which draws the room air inwardly through the grill 14 and an air inlet generally indicated at 13a in FIGURE 7 in heat exchange relationship with a cooling means such as evaporator 16, as shown in FIGURE 7, and thence outwardly through a conditioned air outlet generally indicated at 13b in FIGURE 7 and the grill 14 back into the room. The blower 15 may be driven by a suitable motor 17 which may also drive a fan 18 for circulating outside air through a conventional condenser 19 for removing the heat withdrawn from the room air to exterior of the room. As will be obvious to those skilled in the art, the air conditioner 10 further includes a conventional compressor and associated apparatus (not shown) for effecting the refrigeration operation of the evaporator 16.

As shown in FIG. 1, the air conditioner 10 is provided with a plurality of manually operable control knobs 48a, 48b, and 48c associated with a conventional control 49 (FIG. 2) for controlling the operation of the air conditioner 10. The illustrated air conditioner is provided with a cooling control which may be adjusted by knob 48a, a temperature control which may be adjusted by knob 48b and a blower control actuated by knob 48c for operating the blower without cooling when it is desired to circulate air in the space being conditioned by the air conditioner.

As indicated briefly above, the invention comprehends the provision of means for purifying the air circulated through the air conditioner 10. Herein the air purifying means comprises an attachment generally designated 20 adapted to be installed on the front of cabinet 11. In the illustrated embodiment, the air purifier 20 comprises an enclosure 21 defining an internal space 22 (FIG. 7) communicating rearwardly with the front space portion 13 of cabinet 11. As shown in FIGURE 7, air treating means comprising a filter 23, an absorbing unit 24, and a radiation unit 25 are disposed within space 22. Space 22 is horizontally divided into a lower inlet air passage and an upper outlet air passage by a baffle wall 26 aligned with a corresponding baffle wall 27 in space portion 13 of cabinet 11 overlying the evaporator 16 for directing incoming air successively through the filter 23, the air conditioner air inlet 13a and evaporator 16 to the blower 15, and from blower 15 through the air conditioner conditioned air outlet 13b, the radiation unit 25 and charcoal absorbing unit 24.

As shown in FIGURE 6, the enclosure 21 is provided with a rearward, outwardly offset flange 28 which nests about the forward edge 29 of the cabinet 11. The enclosure 21 is secured to the cabinet 11 by suitable readily disconnectable means such as apertured bracket 30 carried on the cabinet portion 29 and depending pin 31 carried on the enclosure 21 adjacent flange 28. A spacer bracket 32 may be mounted on the enclosure 21 for abutment with a wall portion 33 carried by the cabinet 11. Further, the flange 28 may be secured to the cabinet portion 29 in telescoped association therewith by suitable securing means such as screws 34 (FIGURE 5). Thus, as best seen in FIGURE 7, the enclosure 21 defines a forward extension of the cabinet 11 which may be readily installed thereon after the grill 14 is removed from the cabinet 11 as illustrated in FIGURES 2 and 4.

The assembly generally designated 35 of the air purifier 20 with the air conditioner 10 may be completed by the mounting of the grill 14 on the forward portion 36 of the enclosure 21, as illustrated in FIGURE 5. The control knobs 48 may be connected through the grill 14 to the control 49 by extension elements 37. Extension elements 37 have a female connector end 37a (FIGURE 6) having a cavity to receive control shafts 49a and a male connector end 37b for engaging the cavities in control knobs 48a–48c. The connections are preferably made by press fit for installation ease. A channel member 38 may be provided on the front wall 39 of the enclosure 21 for supporting the forward end of the extensions 37 as shown in FIGURE 6.

The filter unit 23 may comprise a wire basket structure 50 removably installed in the enclosure 21 below wall 26 and supporting a suitable particle filter 40 of fabric in a deep fold arrangement as best seen in FIGURES 6 and 7. In the illustrated embodiment, the filter unit 23 is approximately eight inches deep and provides a high efficiency filtering of the air passing inwardly therethrough to the evaporator 16, thereby maintaining the evaporator coils 51 effectively free of dust and similar foreign matter to maintain the efficiency of heat exchange. In addition to filter 40, at the rear of the grill 14 may be provided a thin plastic sponge particle filter 14a (FIG. 5) preferably flexible polyurethane foam, for prefiltering air entering filter 40. Such a prefilter will prolong the life of the primary filter 23 and is easily cleaned.

The left-hand end of the filter unit 23 is bounded by an upright wall 41 (FIGS. 6 and 7) spaced inwardly from the wall of the enclosure 21 to the right of the channel member 38. Thus as viewed in FIGURE 7, the rear portion 42 of the enclosure space 22 below the horizontal wall 26 and to the right of the upright wall 41 confronts the front portion 13 of the cabinet space 12 and defines therewith a continuous flow passage to the blower 15. The enclosure 21 is preferably internally lined with sound-deadening glass fiber material 52, thereby substantially reducing the noise level of the assembled apparatus 35.

The germicidal unit 25 may comprise eighteen inch germicidal lamps 43 replaceably mounted in vertically spaced relationship on suitable supports 44 whereby the air delivered from blower 15 is directed closely therepast to have the germicidal radiation of the lamps kill airborne viruses and the like. The absorbing unit 24 comprises a plurality of charcoal filled foraminous tubular elements 45 removably carried at their opposite ends by mounting plates 46 in horizontally and vertically spaced relationship so as to absorb, from the air flowing therepast, impurities such as smoke and odor producing material. Supports 44 and 46 are removably installed in the enclosure 21 for facilitated installation and removal for servicing of the units 25 and 24, respectively.

In FIG. 8, a modified form of assembly 135 is shown to include an air purifier 120 which is similar to air purifier 20, except that the charcoal absorbing unit 124 comprises a flat, pervious charcoal element extending across the flow path of the discharging air and retained in place in space 22 by clips 147 carried on the horizontal wall 126. In all other respects the structure of assembly 135 is similar to the structure of assembly 35.

The installation of the air purifier 20 (or 120) on the air conditioner 10 may best be seen by successive consideration of FIG. 1 through 5. Thus, the grill 14 is removed from the front of the air conditioner apparatus 10 and purifier 20 (or 120) installed on the front of the cabinet by suitable engagement of pin 31 with apertured bracket 30. Extensions 37 are connected to control 49 to extend forwardly through the bracket 38 on the purifier. The grill 14 and the filter 14a associated with it is then installed on the front of the purifier and knobs 48a, 48b and 48c are mounted on the forwardly projecting ends of the control extensions 37. Securing of the purifier to the cabinet housing 11 may be completed by attaching the screws 34 through the flange 28 into threaded engagement with the cabinet portion 29.

Operation of the assembled apparatus 35 (or 135) is then effected in the normal manner of operation of the air conditioner 10. Operation of blower 15 causes air to be drawn inwardly through the filter 23, in heat exchange relationship with the evaporator 16, to the blower 15 and discharged from the blower past the germicidal unit 25 and charcoal absorbing unit 24. A substantial portion of the sound produced by the operation of the assembly is absorbed by the sound-deadening material 52. Thus, the assembly effectively purifies and conditions the air while concurrently rendering the apparatus extremely quiet in operation. Replacement of the particle filter 40, the germicidal lamps 43, and the charcoal absorbing elements 45 may be readily effected when desired for facilitated maintenance of the assembly. The assembly may be readily installed on existing air conditioners where it is desired to provide in addition to the air conditioning function the purification function of the invention. As previously mentioned, the illustrated air conditioner is provided with a blower only control which may be actuated by control knob 48c for recirculating air without cooling. Thus the air purifier may be used year around to obtain air purification with relatively inexpensive equipment.

While we have shown and described certain embodiments of our invention, it is to be understood that it is capable of many modifications. Changes, therefore, in the construction and arrangement may be made without departing from the spirit and scope of the invention as defined in the appended claims.

The embodiments of the invention in which an exclusive property or privilege is claimed are defined as follows:

1. A selectively installable attachment for use with an air conditioner provided with a cabinet having means defining an air inlet and a conditioned air outlet in a front portion thereof, a grill, means for mounting said grill in an upright position across said front portion, and means for flowing air into said cabinet through said air inlet and out of said cabinet through said conditioned air outlet, said attachment comprising:
 enclosure means having a front portion and a rear portion, said enclosure means defining an inlet air passage and an outlet air passage;
 means for removably securing said enclosure means to said cabinet at said front portion of said cabinet with said rear portion of said enclosure means confronting said front portion of said cabinet, and with said outlet air passage communicating with said conditioned air outlet;

means for removably mounting said grill across said front portion of said enclosure means in a position substantially parallel to said position of mounting on the cabinet; and means in one of said passages for purifying air flowed through said enclosure means.

2. The attachment of claim 1 wherein said air treating means includes a charcoal filter.

3. The attachment of claim 1 including means for manually controlling the operation of said air flowing means from said front portion of said enclosure means.

4. The attachment of claim 1 including means for directing germicidal radiation through air flowing through said passages.

5. The attachment of claim 1 wherein said air treating means includes a plurality of spaced elongated charcoal structures extending lengthwise perpendicular to the direction of air flow therepast.

6. The attachment of claim 1 wherein said enclosure means is lined with means for reducing the level of sound caused by operation of said air conditioner.

7. The attachment of claim 1 including means for permitting installation and removal of said air treating means through said front portion of said enclosure means.

8. The attachment of claim 1 wherein said securing means comprises cooperating hook means on the top of said enclosure and cabinet means.

9. The attachment of claim 1 wherein filter means is associated with said grill for pre-filtering air entering said enclosure means.

10. The attachment of claim 1 for use with an air conditioner provided with an operating control for said air flowing means, and wherein the apparatus includes extension means connecting said operating control with the front portion of said enclosure means for operating said operating control from the front of said enclosure means.

11. The attachment of claim 1 wherein said means for purifying air further includes air treating means in the other of said passages.

12. The attachment of claim 11 wherein the air treating means in said inlet air passage is a particle filter and wherein the air treating means in said outlet air passage includes an absorbent charcoal element and germicidal radiation means.

13. The attachment of claim 12 including filter means mounted on said grill and wherein said enclosure means is lined with sound absorbing glass fiber.

14. In combination, an air conditioner provided with a cabinet having means defining an air inlet and a conditioned air outlet in a front portion thereof, air cooling means in said cabinet, a grill, means for mounting said grill in an upright position across said front portion, means for flowing air into said cabinet through said air inlet and out of said cabinet through said conditioned air outlet, and an attachment comprising enclosure means having a front portion and a rear portion, said enclosure means defining an inlet air passage and an outlet air passage, means for securing said enclosure means to said cabinet at said front portion of said cabinet with said rear portion of said enclosure means confronting said front portion of said cabinet, and which said inlet air passage communicating with said air inlet and with said outlet air passage communicating with said conditioned air outlet, means for mounting said grill in an upright position across said front portion of said enclosure means, and means in said enclosure means for purifying air flowed through said enclosure means, said means for purifying air including air treating means in one of said passages.

15. The combination of claim 14 including control means for operating said means for flowing air independently of said air cooling means, whereby air may be purified without cooling thereof.

16. An auxiliary air treatment attachment comprising: enclosure means defining a front opening and a rear opening, means in said enclosure means for treating air flowed therethrough; means mounting said enclosure on an air conditioner front, said front normally being provided with a grill, said enclosure being mounted on said front with said rear opening opening thereto; and means for mounting the front grill of the air conditioner on said enclosure with said front opening opening thereto.

References Cited
UNITED STATES PATENTS

| | | | |
|---|---|---|---|
| 2,299,527 | 10/1942 | Cody et al. | 62—262 |
| 2,386,303 | 10/1945 | Eberhart | 62—262 X |
| 2,472,792 | 6/1949 | Cohler | 62—262 |
| 2,589,229 | 3/1952 | Dauphinee | 55—307 |
| 2,638,644 | 5/1953 | Rauhut | 55—279 X |
| 2,677,253 | 5/1954 | Lee | 62—261 |
| 2,682,159 | 6/1954 | Trask | 62—262 |
| 2,711,087 | 6/1955 | Jennings | 62—129 |
| 2,730,873 | 1/1956 | Hardin et al. | 62—262 X |
| 2,737,788 | 3/1956 | Buttner | 62—140 |
| 2,763,139 | 9/1956 | Callan et al. | 55—354 X |
| 2,933,151 | 4/1960 | Kurtz | 55—124 X |
| 2,945,554 | 7/1960 | Berly | 55—279 |
| 2,971,351 | 2/1961 | Webster | 98—101 X |
| 2,986,016 | 5/1961 | Gillham et al. | 62—161 |
| 3,159,983 | 12/1964 | Metcalfe | 62—262 |
| 3,261,147 | 7/1966 | Allander | 55—269 X |

DENNIS E. TALBERT, JR., Primary Examiner

U.S. Cl. X.R.

21—74; 55—279, 316, 385, 387, 500, 521; 62—262

PO-1050
(5/69)

UNITED STATES PATENT OFFICE
CERTIFICATE OF CORRECTION

Patent No. 3,509,697          Dated May 5, 1970

Inventor(s) JAMES F. DEWEY, THOMAS G. SCHEITLIN and WILLIAM R. THOMAS

It is certified that error appears in the above-identified patent and that said Letters Patent are hereby corrected as shown below:

Claim 1, column 5, line 1 after "said" (first occurrence) insert the wording:

-- inlet air passage communicating with said air inlet and with said --;

Claim 14, column 6, line 10, the word "which" should be corrected to -- with --.

SIGNED AND
SEALED
DEC 1 - 1970

(SEAL)
Attest:

Edward M. Fletcher, Jr.
Attesting Officer

WILLIAM E. SCHUYLER, JR.
Commissioner of Patents